Nov. 13, 1928.
P. B. ASHWORTH
1,691,509
TANK FOR INFLAMMABLE LIQUIDS
Filed Feb. 4, 1928
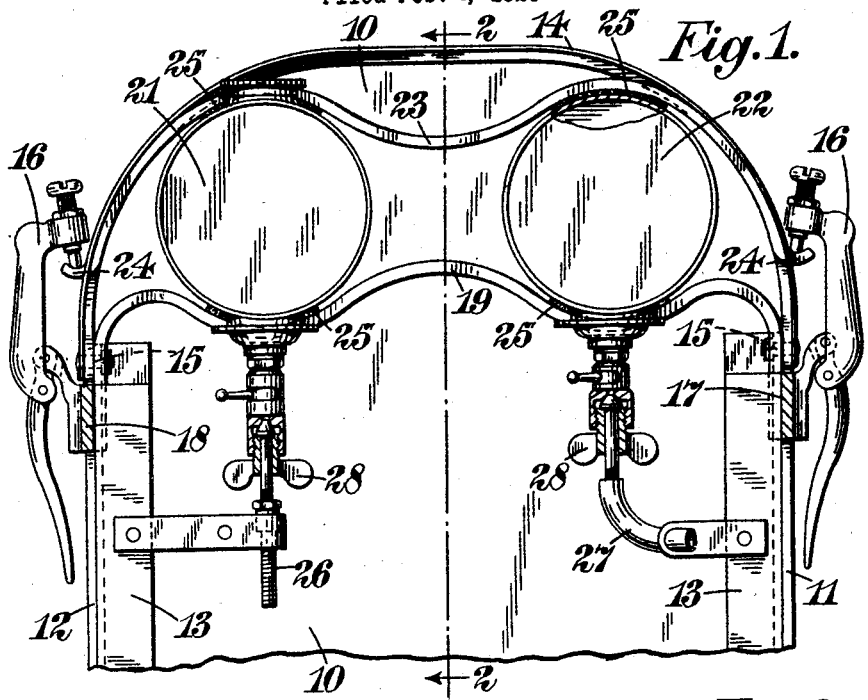
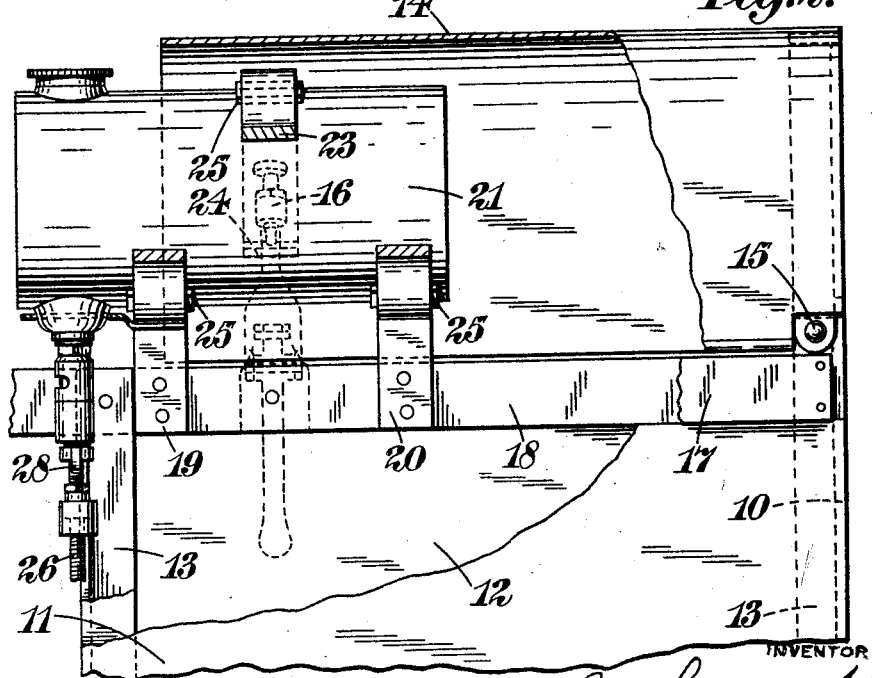

Patented Nov. 13, 1928.

1,691,509

UNITED STATES PATENT OFFICE.

PERCY BENJAMIN ASHWORTH, OF CAM, ENGLAND, ASSIGNOR TO R. A. LISTER & COMPANY, LIMITED, OF KURSLEY, GLOUCESTERSHIRE, ENGLAND, A BRITISH COMPANY.

TANK FOR INFLAMMABLE LIQUIDS.

Application filed February 4, 1928, Serial No. 251,926, and in Great Britain April 7, 1927.

This invention is for improvements relating to tanks for imflammable liquids, and is concerned with means for releasing them from a housing in which they are contained, in an easy manner, so that they can be removed bodily when desired, as for instance in the event of fire.

According to the present invention, there is provided in or for an internal-combustion engine (for example, on a motor-driven truck) a housing for a tank containing fuel, oil or other inflammable liquid, comprising a removable closure-member for the housing, and a bracket, or brackets, within the housing so arranged that the tank is gripped between the closure-member and the bracket, or brackets, when the housing is closed, but released when it is open.

The invention is especially applicable to motor-driven trucks, and in particular to that type of motor-driven truck in which the power-unit and associated transmission-mechanism and the driving-wheel are mounted so as to be movable as a unit for steering purposes. The invention further comprises in a motor-truck of the above-mentioned type, the combination with a housing containing the power-unit and associated-mechanism, of a bracket, or brackets, thereon shaped to receive the fuel and/or oil-tanks, a removable cover for said housing, and a shaped clamping-member secured on the cover in such position as to grip the tank, or tanks, when the cover is closed, but release said tank, or tanks, when it is open.

For a more complete understanding of the invention, there will now be described by way of example, and with reference to the accompanying drawings, a construction of housing according to the invention, suitable for a motor-truck. In the drawings:

Figure 1 is an end-elevation partly in section, looking into the interior of the housing, and Figure 2 is a part sectional elevation on the line 2—2 of Figure 1.

The power-unit and transmission-mechanism, together with a combined driving and steering road-wheel, are mounted on a circular framework which is carried by and free to turn on the chassis of the truck in order to steer it. These parts are not shown on the drawings as they form no part of the present invention, and may be of any suitable construction.

According to the invention, the housing aforesaid is rectangular in plan and has three vertical sides 10, 11 and 12, hereinafter referred to as the front- and side-plates respectively. If desired, a back-plate may be provided so as completely to close the housing. The plates aforesaid are detachably, or otherwise, secured to vertical angle-irons 13 disposed at the corners of a rectangle. The housing is closed at the top by a lid 14 which is hinged, as shown at 15, to the two front angle-bars 13, and said lid is held closed by quick-release fasteners 16 of known construction, one at each side of the housing. The lid 14 is arched from the edge where it rests on a bar 17 secured to the upper ends of the angle-irons 13 at one side of the housing, to the opposing edge which rests on a similar bar 18 connected to the angle-irons 13 at the other side of the housing. The lid, when lowered on to the side bars 17, 18 closes the upper end of the housing.

Carried by the longitudinal bars 17, 18, of the housing and extending transversely across the housing are two bars 19, 20 which are bent, as shown in Figure 1. to receive the lower portions of two cylindrical tanks 21, 22. in such a manner that the axes of the said tanks lie in a horizontal plane and parallel to the sides of the housing. The tank 21 contains petrol, and the tank 22. oil. The bars 19, 20, are so positioned that the tanks 21, 22 are substantially contained within the arch of the lid 14 when the latter is closed. The lid carries a co-operating-bar 23 lying in plan-view midway between the supporting-bars 19, 20 and shaped to embrace partially the top portions of the two tanks. The ends of the bar 23 project through the lid 14, as shown in Figure 1, and form hook-portions 24 with which the aforesaid quick-release fasteners 16 co-operate to fasten the lid securely in position. Felt pads 25 are provided between the bars 19, 20 and 23, and the tanks 21, 22.

The unions of the petrol- and oil-pipes 26, 27, with the tanks 21, 22 respectively, are provided with wing-nuts 28 so that they are easily detachable. It will be seen that when the lid is shut the tanks are securely gripped between the supporting-bars 19, 20 and the bar 23 carried by the lid, but when the lid is open, and the wing-nuts 28 are unscrewed, the tanks are released from the structure of the housing and can be readily removed.

It is to be understood that the invention is not limited to the precise details set forth, as many changes may be made within the scope of the invention. For instance, the lid need not be hinged if quick-release fasteners are provided to maintain it firmly in the closed position, also the tanks may be carried in a vertical or oblique position. Further, as many tanks, as desired may be mounted in the manner described and they can be of any suitable shape or size.

I claim:

1. A housing for a tank containing inflammable liquid that is supplied from said tank to an internal-combustion engine, comprising a removable closure-member for the housing and a bracket within said housing so arranged that the tank is gripped between the closure-member and the bracket when the housing is closed, but released when it is open.

2. In a motor truck of the type described, the combination with a housing for the fuel and oil tanks, of a bracket thereon shaped to receive the said tanks, a removable cover for said housing, and a shaped clamping member secured on the cover in such position as to grip the tanks when the cover is closed, but release them when it is open.

3. The combination, in a motor truck of the type described, with a housing for the fuel and oil tanks, of a bracket thereon comprising a bar bent to receive the lower portions of the tanks and to support the latter in such a manner that each tank lies substantially horizontal and parallel to the sides of the housing, a removable cover for said housing and a shaped clamping member secured on the cover in such position as to grip the tanks when the cover is closed but release them when it is open.

4. The combination, in a motor truck of the type described, with a housing for the fuel and oil tanks, of a bracket thereon shaped to receive the fuel and oil tanks, a removable cover for said housing, and a clamping member secured on the cover and comprising a bar shaped to embrace partially the top of the tanks so as to grip the tanks when the cover is closed, but release them when it is open.

5. The combination, in a motor truck of the type described, with a housing for the fuel and oil tanks, of a bracket thereon shaped to receive and to support said tanks, a removable cover for said housing, a shaped clamping member secured on the cover, and quick-release fasteners adapted to co-operate with said clamping member, for the purpose specified.

6. In a motor truck of the type referred to, the combination with a housing containing the power unit and associated mechanism, of a plurality of bars carried by said housing and each shaped to receive the lower portions of the said tanks and to support the latter in such a position that each tank lies substantially horizontal and parallel to the sides of the housing, a removable cover for said housing, a clamping member secured on the cover and comprising a bar bent to embrace partially the top of the tanks when the cover is closed, hook portions on said clamping member which extends through the cover, and quick-release fasteners adapted to co-operate with said hook portions, substantially as and for the purpose described.

In testimony whereof I affix my signature.

PERCY BENJAMIN ASHWORTH.